J. SIAKEL.
SANDPAPERING MACHINE.
APPLICATION FILED AUG. 2, 1918.

1,364,324.

Patented Jan. 4, 1921.
9 SHEETS—SHEET 1.

Fig. 1.

INVENTOR
John Siakel
BY
Frank Schraeder Jr.
Attorney

J. SIAKEL.
SANDPAPERING MACHINE.
APPLICATION FILED AUG. 2, 1918.

1,364,324.

Patented Jan. 4, 1921.
9 SHEETS—SHEET 3.

INVENTOR
John Siakel
BY
Frank Schnauder Jr
Attorney.

UNITED STATES PATENT OFFICE.

JOHN SIAKEL, OF CHICAGO, ILLINOIS.

SANDPAPERING-MACHINE.

1,364,324.  Specification of Letters Patent.  Patented Jan. 4, 1921.

Application filed August 2, 1918. Serial No. 248,013.

*To all whom it may concern:*

Be it known that I, JOHN SIAKEL, a subject of the Emperor of Austria and Hungary, residing in the city of Chicago, in the county of Cook and State of Illinois, have invented new and useful Improvements in Sandpapering-Machines, of which the following is a specification.

This invention relates to power driven sand-papering machines arranged to sandpaper the edge of a single board or a plurality of boards and has among its objects to provide a novel machine of this character which shall be flexible and efficient in operation.

With these and other objects in view my invention consists in the novel construction, combination, and relative position of the parts and members shown in the accompanying drawings, hereinafter described, and particularly pointed out in the appended claims.

Referring to the drawing in which like reference characters indicate like or corresponding parts:

Fig. 16 illustrates a plan view of the sliding bar operating to reverse the movement of the shoes.

Referring to the drawings, I provide a pair of suitable stationary end frames 20 having legs 21 and being arranged to support the longitudinally extending trackways 22. Slidably mounted upon the trackway 22, is a frame 23 which is provided, at the central portion thereof, with a pair of interconnected integrally cast depending sleeves 24 internally threaded to receive the threaded propelling shaft 25, the rotation of which in one direction will move the frame 23 to the left while a reverse motion of shaft 25 will move the frame 23 to the right. The alternate rotations of shaft 25 are transmitted from the drive shaft 26 and interconnected gears 27 and 28. The shaft 26 has a pair of pulleys 29 and 30 having connection with a suitable reversing power mechanism (not shown) through belts 31 and 32. The ends of shaft 25 are loosely mounted in bearings 25ᴬ.

The work-supporting table 33 is a rectangular hollow open top casing and is mounted for sliding movement transverse the frame 23 upon rotation of the hand crank 34 and shaft 35 which has a pair of worms 36 in mesh with the gears 37 mounted rigidly to the threaded screws 38 which pass through the bottom of the table 33 and which upon rotation will move same responsive to the rotation of crank 34.

To provide facilities for slightly raising the stack of boards and rotating same so as to present any one of the four edges to the operating sand-paper rolls 39, I provide the table 33 with a movable platform 40 which is substantially circular in form with two pair of opposed integral arms arranged at right angles and adapted to fit into the supporting ledges 33$^A$. The platform 40 is mounted on the ball bearing head 41 of the screw 42 which is mounted and guided for vertical movement in the stationary collar 43, having a key 44 operating in a longitudinal slot within the screw 42. Thus upon the rotation of shaft 45, worm 46, and worm gear 47, the interior threads of gear 47 will operate to raise the screw 42 and platform 40 whence it may be revolved upon the ball bearing head 41.

Figures 13, 14:
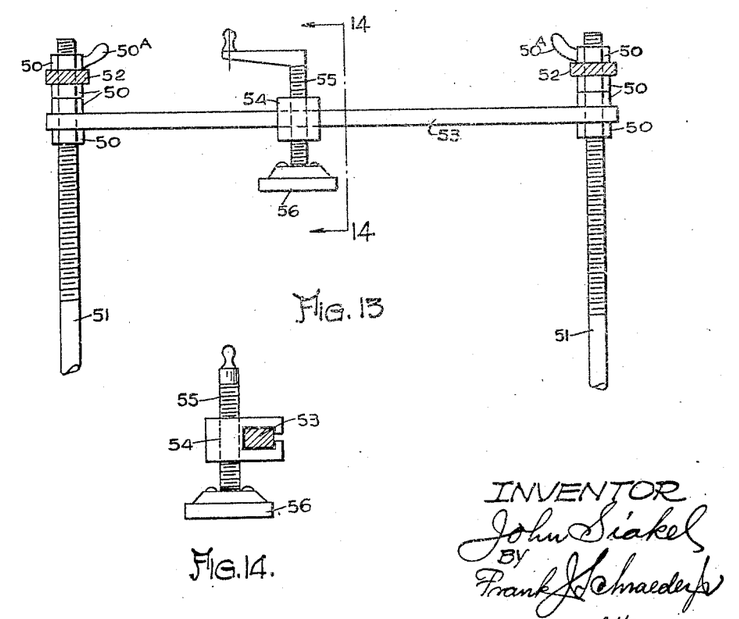
Fig. 13 shows bars to exert a pressure upon the face near the edges of the boards to be sand papered, to securely retain them in alinement.
Fig. 14, is a cross section taken on line 14—14 of Fig. 13.

For purposes of rigidly securing the work to the table 33, I provide a pair of vertically disposed uprights or standards 48 which are threaded and cross connected with a retaining or securing bar 49 loosely mounted between the special nuts 50 having ears or integrally cast arms 50$^A$ for hand rotation. These standards 48 are provided with enlarged heads 48$^A$ for sliding movement within the parallel slots 33$^B$ for adjusting purposes. At each corner the frame 23 is a fixed heavy standard 51 threaded for the greater part thereof, and arranged for cross connection transversely of the longitudinal axis of the frame 23 with bars 52, and parallelly with the longitudinal axis with bars 53. The several nuts 50 are adjustable and arranged to rigidly confine both bars 52 and 53 in their spaced relative positions. The bar 53 which lies nearest the rolls 39 is provided with block 54 slidably mounted thereon and arranged to receive a crank operated screw 55, one end of which is loosely mounted within the pressure head 56 (see Figs. 13 and 14). It is obvious that the block 54 may be moved along the top face of the boards above the edges to be sand papered and that upon manual operation of screw 55 the edges may be placed under additional pressure to be retained in alinement.

The table 33, is provided with oppositely extensible arms 57 arranged in staggered pairs whereby the supporting surface of the table may be increased by extending either one or all of the four arms 57. Each arm 57 is slotted longitudinally to permit movement over the tightening bolt 58 which has a countersunk head fitting flush with top of the arms.

The invention herein shown contemplates the use of one or more sand papering traveling belts 59 and as herein shown in attached drawings, two parallel belts 59 are employed to sand paper the top face or surface of the board while the sand paper rolls 39 are working upon the edges of the boards. Each sand paper belt is made of any suitable flexible and durable material having the exposed or outer face covered with sand paper or any other abasive material, and each belt is continuous and is mounted upon a head or drive pulley 60 and foot pulley 61.

Figure 1:
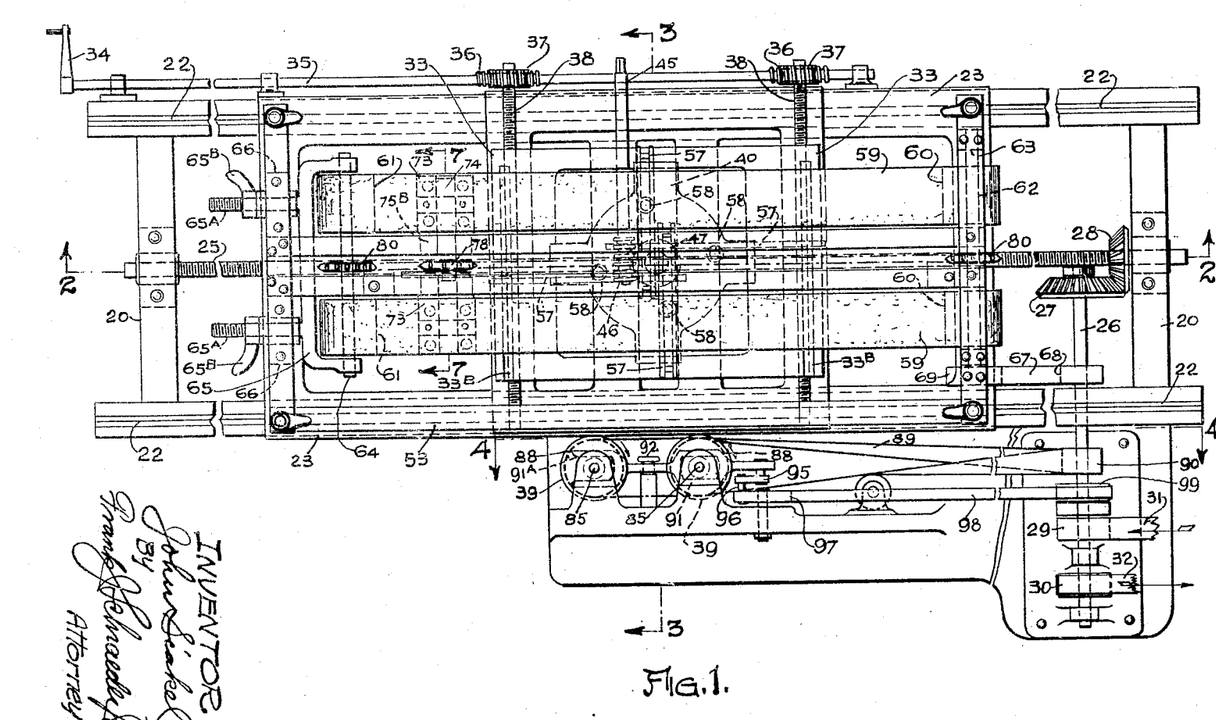
Figure 1 is a plan view of my preferred form or construction embodying my invention.
Figure 2:
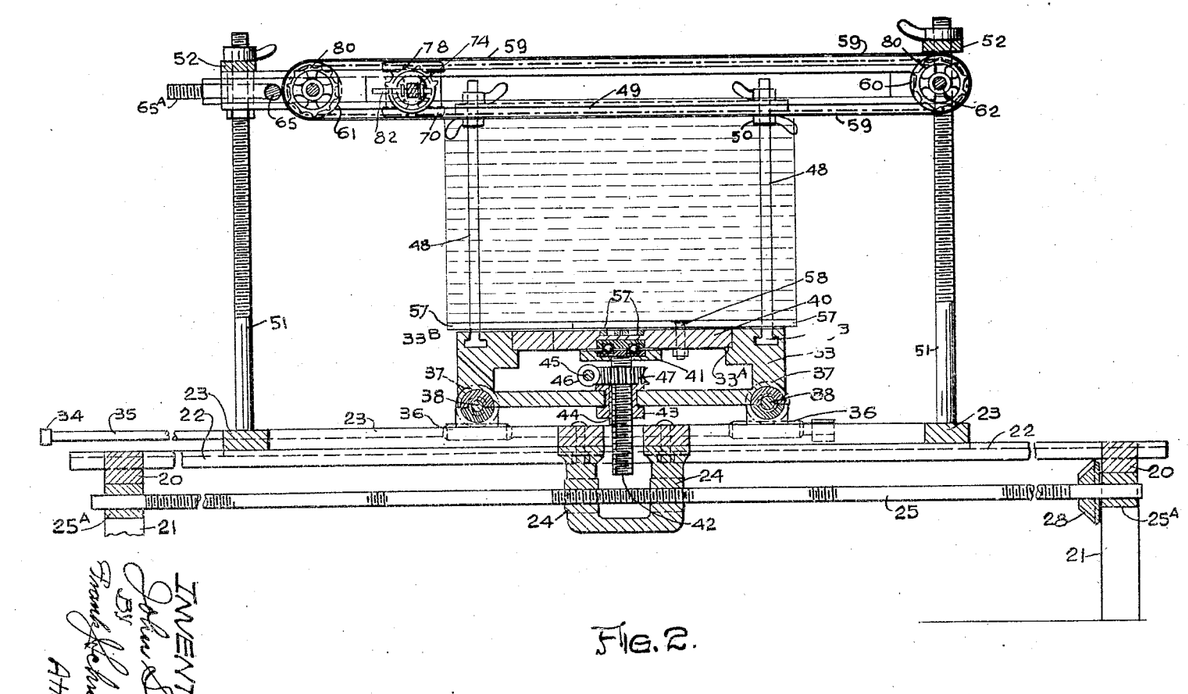
Fig. 2 is a sectional elevation taken on line 2—2 of Fig. 1 showing a stack of boards in position for sand-papering.
Figure 3:
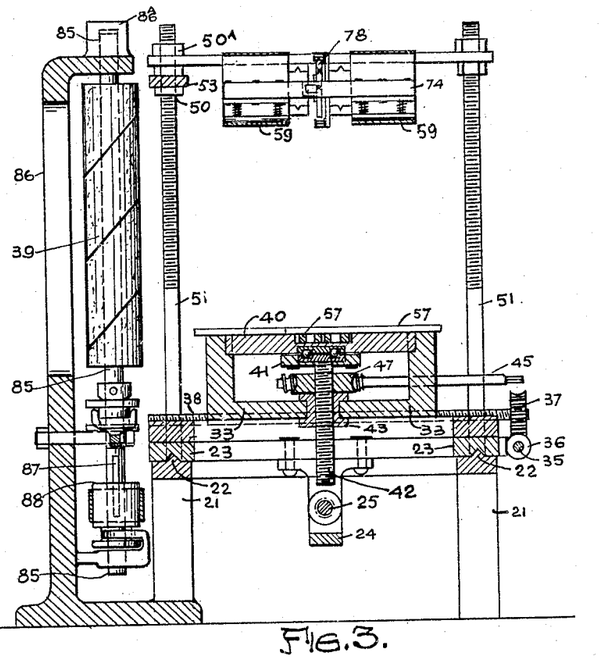
Fig. 3 is a cross section taken on line 3—3 of Fig. 1 showing the relative position of the sandpaper rolls, work table, and sand-paper belts.
Figure 4:
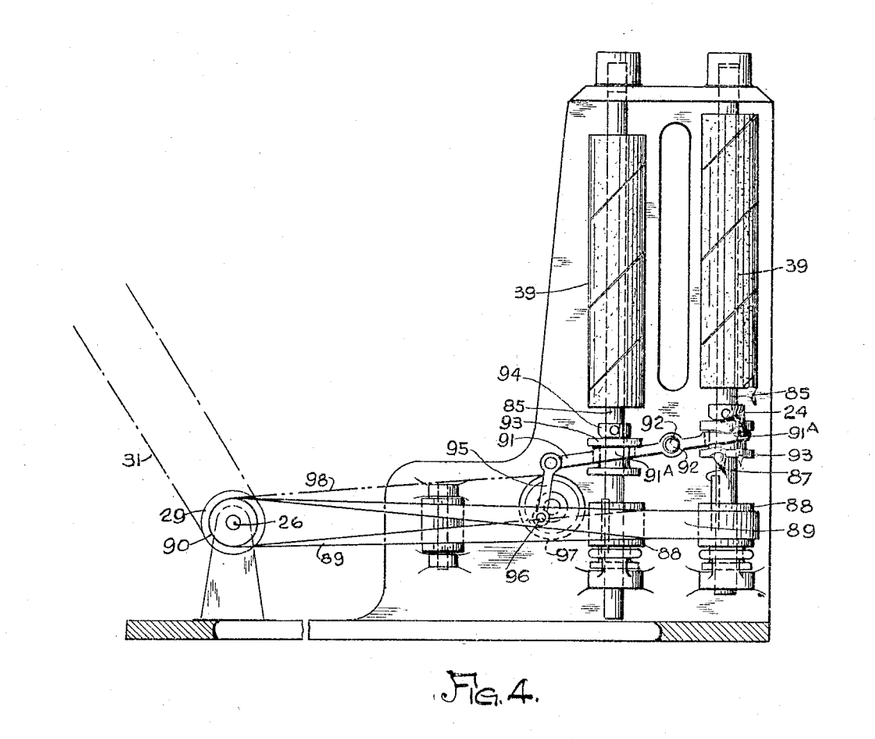
Fig. 4 is a cross section taken on line 4—4 of Fig. 1 showing the sand-paper rolls and their propelling mechanism.
Figure 5:
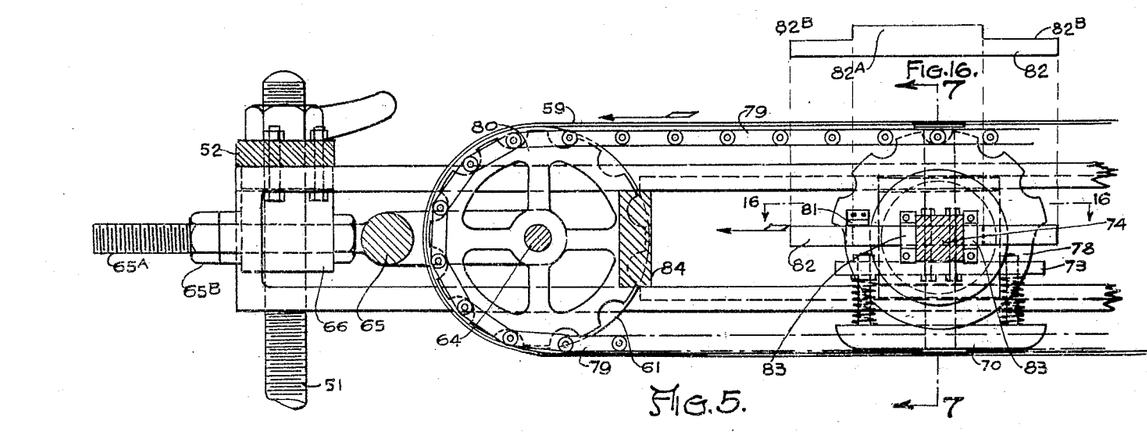
Figs. 5 and 6 are enlarged sectional details of the sand-paper belts showing respectively, in Fig. 5, the position of the traveling or reciprocating pressure shoe during movement from the head or drive end to the foot end, and in Fig. 6, the position of the shoe at the point of reverse movement toward the head end.
Figure 6:
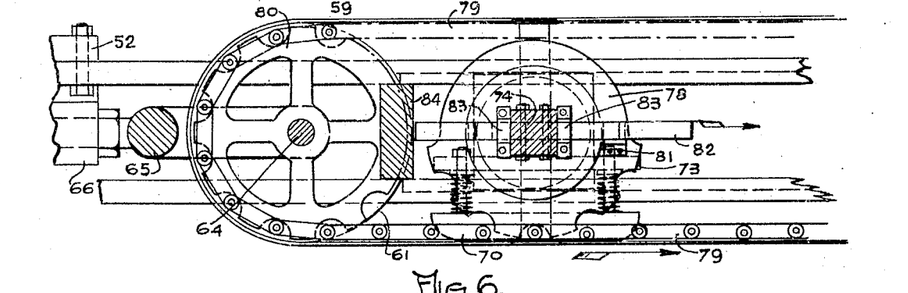
Figure 7:
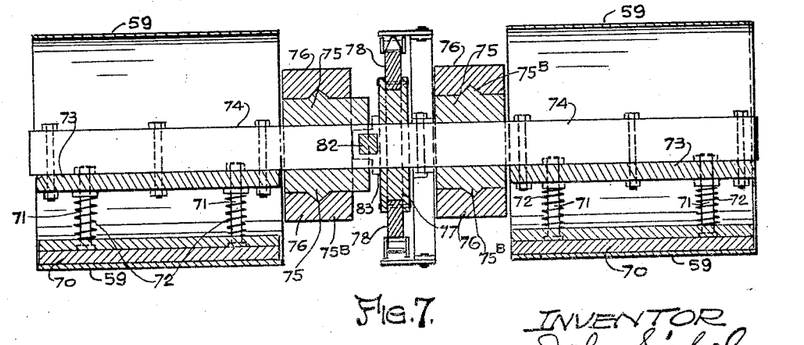
Fig. 7 is an enlarged section on line 7—7 of Fig. 1, and shows the two parallel pressure shoes and their supports.

The head pulleys 60 are rigidly mounted to the shaft 62 which is held in fixed position in a pair of end bearings 63 secured to the cross bar 52. The foot pulleys 61 are loosely mounted upon shaft 64 the ends of which are held in a tightening yoke 65 having integral tightening screws 65$^A$ extending through the solid boxes 66 which are bolted to the supporting frame 52, thus by tightening the nuts 65$^B$ both belts 59 are held taut. Both belts receive motion through the belt drive 67 extending from the drive pulley 68 on shaft 26 to the pulley 69 rigid on shaft 62. In order to exert a pressure upon the lower run of each traveling belt 59, I provide a pair of interconnected parallel reciprocating pressure shoes 70 which are rectangular in shape and which are supported upon four equally spaced bolts 71 having coiled springs 72 between the back of the shoe and plate 73 to provide spring action to the shoes. The bolts 71 are arranged for free sliding movement within the plate 73, which plate is rigidly connected to the square steel cross beam 74 which interconnects the two shoes. The cross beam 74 is provided with a pair of symmetrically arranged steel treads 75 having triangular raised guides 75$^B$ arranged for sliding movement within the V grooves of the track 76. Centrally mounted upon the cross beam 74 and rigidly connected thereto, is a grooved sheave 77 which is adapted to retain the sprocket wheel 78, which sprocket is formed substantially with teeth along one half of the periphery. This segmental sprocket 78 is arranged to travel between the chain 79 which extends around the sprockets 80 mounted upon the shafts 62 and 64. The angle 81 is riveted to one face of the sprocket, as shown in Fig. 5, for the purpose of providing a stop for the sprocket when the outstanding leg of the angle contacts with the face of the enlarged portion 82$^A$ of the sliding bar 82. It will be observed that the bar 82 extends through the cross beam 74 and is slidably mounted within the strap guides 83 which are rigidly secured to the face of the sheave 77. Referring now to Figs. 5 and 6, it is obvious that the anti-clockwise movement of the sprockets 80 will move the upper strand of the chain 79 toward the left and inasmuch as the sprocket 78 is engaged thereby it will be carried also toward the left and thus move the cross beam 74 and the two pressure shoes until the end of the sliding bar 82 comes in contact with the stationary bar 84 whereupon continued movement toward the left will move the bar 82 toward the right to permit the rotation of the sprocket 78 by permitting a passage of the stop angle 81 through the recessed end 82$^B$ of the sliding bar. It is now obvious that during the rotation of the sprocket 78 the shoe 70 will be held in stationary position until the lower strand of the chain 79 engages the segmental tooth section of the sprocket and continues its rotation until the angle 81 engages the under side of the enlarged portion 82^A of the sliding bar whereupon the sprocket will be held against further rotation and will then be carried toward the right by the movement of the lower strand of chain 79. Fig. 6 illustrates the position of the sprocket in its return toward the right. A cross bar similar to bar 84 is placed near the head end of the operating chain drive sprocket 80 to engage the projecting end of the sliding bar 82 when the shoes 70 reach that end of their travel whereby the movement of the shoes 70 will again be reversed. It is obvious that the cross bars 84 may be made movable so as to vary their spaced distance apart and thus the length of the travel of the shoes 70 may be varied to suit the length of the board to be sand-papered.

It is obvious that the vertical movement of the two end bars 52 will establish the distance of the sand paper belts 59 above the top of the table 33.

The two sand-paper rolls 39 are arranged in parallel spaced relation and are rigidly mounted upon the vertical spindles 85 the upper ends of which have free sliding movement within the bearings 86^A which are cast integral with the frame 86. The lower ends of the spindles 85 are provided with keys 87 which have sliding movement within the solid cast iron pulleys 88 and around which pulleys passes a drive belt 89 receiving power from the pulley 90 rigidly mounted upon the drive shaft 26. This belt 89 imparts rotation to the two sand-paper rolls 39 and is also subject to the reversing action imparted to the drive shaft 26 through drive belts 31 and 32. In order to impart a slightly vertical movement to the rolls 39 simultaneously with their rotation upon the spindles 85, I provide a mechanism which consists of an oscillating arm 91 which is pivoted at 92 and which has forked arms 91^A arranged to embrace the loose collar 93 loosely mounted under the collars 94 which are rigidly fixed to the shafts or spindles 85. A link 95 connects the free end of the oscillating arm 91 to the pin 96 arranged eccentrically within the pulley 97. A belt 98 connects the pulley 97 with the pulley 99 also located on the drive shaft 26. Thus by the operation of the pulley 97 the oscillating arm 91 will be reciprocated through the link connection 95 to alternately raise and lower the two rotating rolls 39 during their rotation on their spindles.

Figure 8:
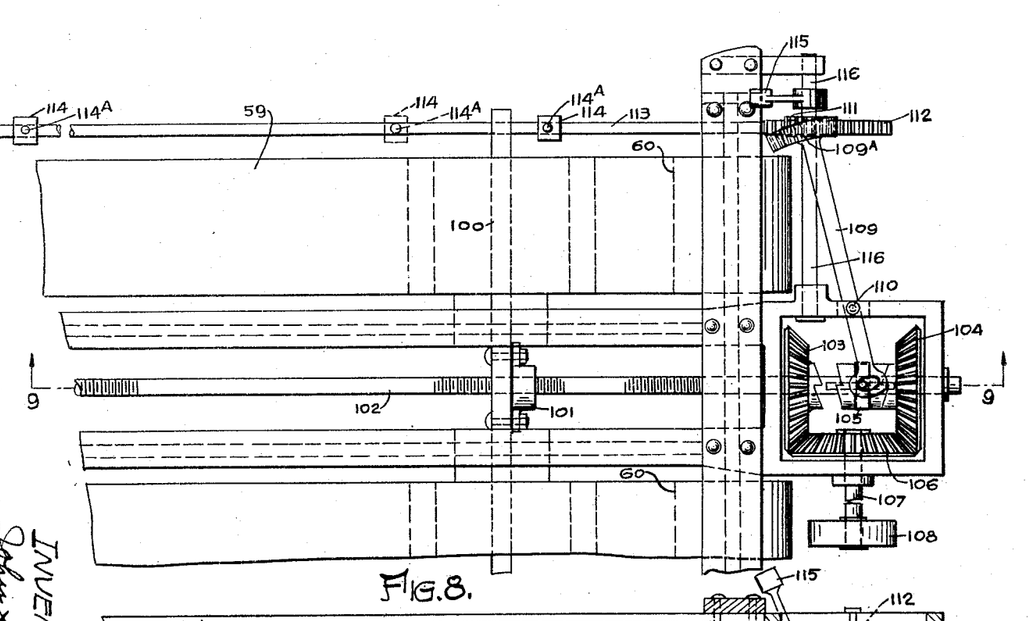
Fig. 8 is a plan view of a modified form of automatic reversing and propelling mechanism for the sand-papering belts.
Figure 9:
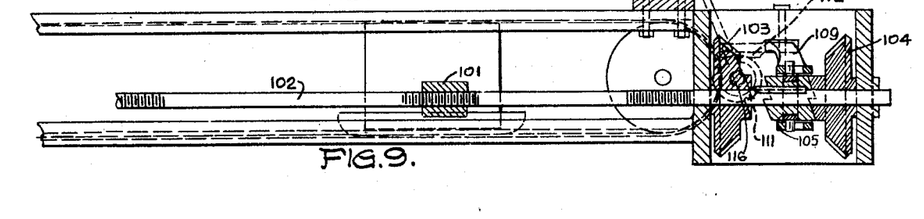
Fig. 9, is a cross section taken on line 9—9 of Fig. 8.

Figs. 8 and 9, illustrate a modified drive for the sand-paper belts and in this case, the two belts 59 are carried on a cross beam 100 which is provided with a centrally rigidly mounted nut 101, interiorly threaded for engagement with and reciprocating movement by the threaded rod 102 one end of which carries the two loosely mounted bevel gears 103 and 104 which are arranged for alternate engagement the movable clutch 105 having constant operative connection with rod 102. Both gears 103 and 104 have constant connection with the bevel gear 106 rigidly mounted on shaft 107 upon which is rigidly mounted the continuously power-driven pulley 108 adapted for suitable connection with any source of power. The clutch-operating lever 109, pivoted at 110, is formed with an arcuate rack, 109^A having teeth in mesh with the pinion 111, the opposite side of which is engaged by the teeth of the rack 112 formed at end of the slidable rod 113. Upon the rod 113 are lugs 114, one near each end, which are adjustable longitudinally thereof according to the desired length of travel of the pressure shoes 70. A set screw 114^A is provided for purposes of rigid mounting in fixed position. These lugs 114 are engaged by the beam 100 in its movement and thus the rod 113 and rack 112 are shifted, whereupon the movement of pinion 111 will operate the clutch lever 109 to disengage the clutch 105 from either one of the gears 103 or 104 and move same toward the other. At this point of the operation the movement of the pressure shoes 70 is stopped and they would remain in stationary position were it not for the weighted arm 115, (which is rigidly keyed to shaft 116 which has rigid connection with pinion 111) which having passed a dead center continues by gravity to move the shaft 116 whereby the lever 109 will continue to move to bring the clutch 105 into engagement with the opposite gear and thus reverse the travel of the pressure shoes.

Figure 10:
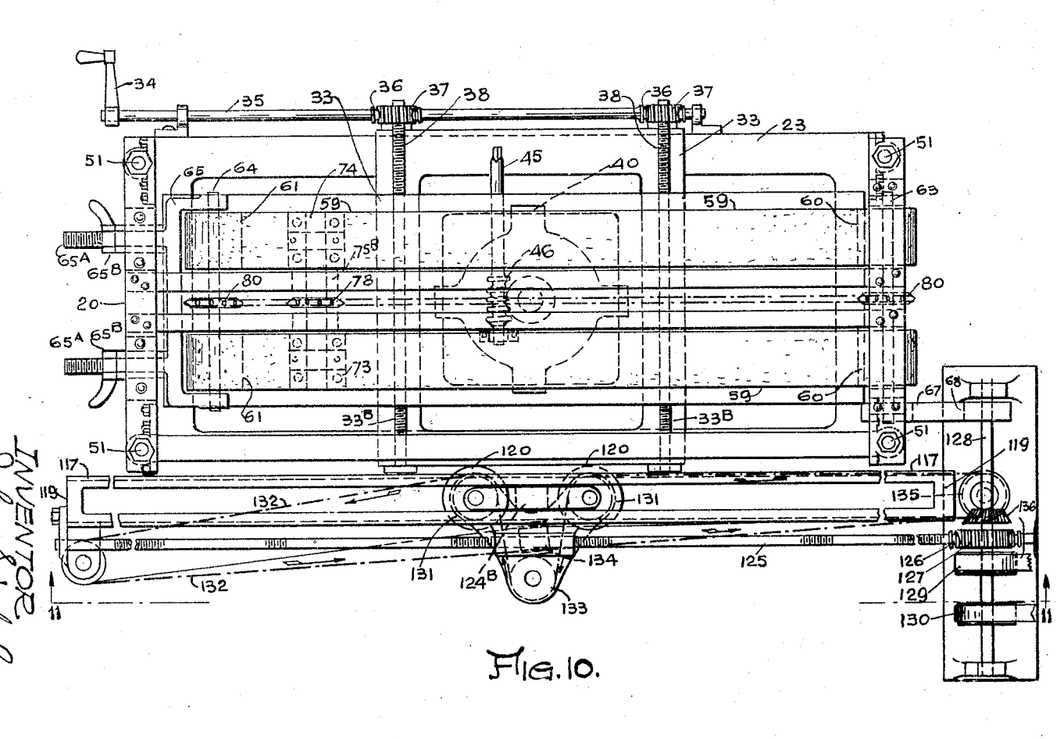
Fig. 10, is a plan view of a modified machine using a pair of sand-paper rolls traveling transversely to the axis of their rotation.
Figure 11:
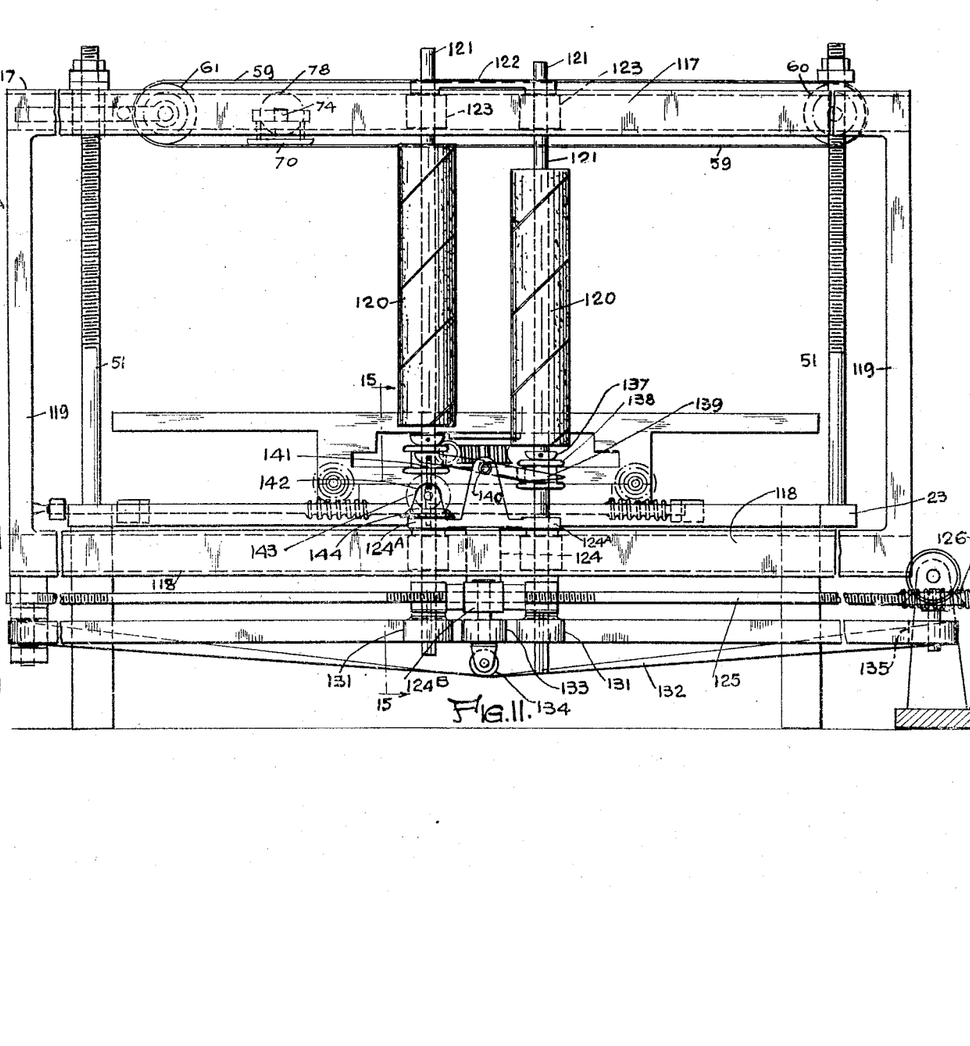
Fig. 11 is a sectional elevation taken on line 11—11 of Fig. 10.
Figure 12:
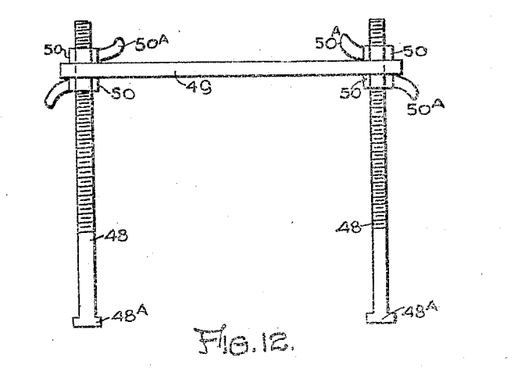
Fig. 12 illustrates the securing bar and threaded standards slidably mounted in the work table, see Fig. 2.
Figure 15:
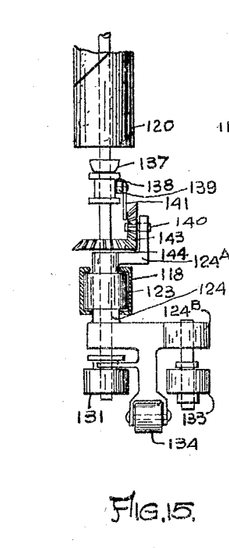
Fig. 15 is a section taken on line 15—15 of Fig. 11.

Referring now to Figs. 10, 11 and 15 which show a modification of the machine above described and which in this case includes means for moving the two parallel revolving rolls 120 longitudinally of the frame 23 and which provides for a pair of parallel upper and lower cast iron channel guides respectively 117 and 118 interconnected by end struts 119. The rolls 120 are rigid on spindles 121, the upper ends of which are slidably supported within the double bearing 122 and rollers 123 arranged to travel with the channel guides 117. The lower ends of spindles 121 are slidably mounted in the ears 124^A of the bearing 124, the lower end of which bearing has a depending integral section 124^B interiorly threaded for operative engagement with the longitudinally extending threaded rod 125 having power connection through the worm 126 and gear 127 with the power shaft 128. A pair of pulleys 129 and 130 having belt connections to a suitable automatically operating reversing mechanism (not shown) alternately drives such pulleys with reverse motions and thus through rod 125 reciprocates the two rolls 120 longitudinal to the frame 23. Simultaneously with such movement the rolls 120 receive a rotary axial motion through means of the pulleys 131 mounted on the lower ends of spindles 121 and belt 132 which passes around same and the idler pulleys 133 and 134 and around the drive pulley 135 connected through the bevel gears 136 with power shaft 128.

Simultaneously with these two motions the rolls 120 are alternately raised and lowered, as in the above described machine, and in this case the collars 137 fixed to spindles 121, are supported upon the loose collars 138 which are engaged within the forked ends of the oscillating arm 139 which is pivoted at 140 upon an integral fulcrum of the bearing 124. The arm 139 is connected, through link 141, with a crank arm 142 operatively connected through bevel gears 143 and 144 to one of the spindles 121.

It is thought that the foregoing description and illustrations clearly disclose the construction and operation of the invention, hence a more extended explanation is omitted.

I claim:

1. In a sand-papering machine, the combination of a plurality of rotary vertically mounted sand-paper rolls, a single oscillating arm for simultaneously raising and lowering both said rolls in opposite directions during their axial rotation, and means for operating said oscillating arm.

2. In a sand-papering machine, the combination of a plurality of rotary vertically mounted sand-paper rolls, means for alternately raising and lowering said rolls simultaneously with their axial rotation, tracks, a frame movable on said tracks, a work-supporting table mounted on said frame, and means for moving said table transversely to said frame and to and from said rolls.

3. In a sand-papering machine, the combination of a plurality of rotary vertically mounted sand-paper rolls, means for alternately raising and lowering said rolls simultaneously with their axial rotation, tracks, a frame movable on said tracks, a work-supporting table mounted on said frame, manually operable means for moving said table transversely to said frame, a vertically movable platform on said table, and means for raising and lowering said platform.

4. In a sand-papering machine, the combination of a plurality of rotary vertically mounted parallel rolls, an oscillating arm for raising and lowering said rolls simultaneously with their axial rotation, mechanism for operating said oscillating arm, tracks, a frame movable on said tracks, a work-supporting table mounted on said frame, manually operable means for moving said table transversely to said frame, a vertically movable platform mounted on said table, and manually operable means for raising and lowering said platform.

5. In a sand-papering machine, the combination of a plurality of rotary rolls adapted to sand-paper the edges of a stack of boards, a continuous traveling belt arranged to sand-paper the face of the top board in said stack, and a pressure shoe for exerting pressure on the lower run of said belt.

6. In a sand-papering machine, the combination of a plurality of rotary rolls adapted to sand-paper the edges of a stack of boards, a plurality of continuous traveling abrasive belts, a plurality of reciprocating pressure shoes exerting pressure upon the lower runs of said belts, resilient mountings for said shoes, a cross beam connecting said mountings, tracks for guiding said cross beam, a grooved sheave mounted on said beam, a segmental sprocket mounted in the groove of said sheave, a chain drive for alternately bodily moving and partially rotating said sprocket, a stop on the face of said sprocket, a sliding bar carried by said beam for limiting the movement of said stop and said sprocket, and stationary means for engaging the slidable bar to shift same from under said stop to permit the rotation of said sprocket whereby the movement of the beam and shoes will be reversed.

7. In a sand-papering machine, the combination of a plurality of rolls adapted to sand-paper the alined edges of a stack of boards, a continuous traveling abrasive belt arranged to sand-paper the face of the top board in said stack, a pressure shoe arranged to reciprocate and exert pressure on the lower run of said belt for working contact with said top board, and means for reciprocating said shoe.

8. In a sand-papering machine and in combination, a plurality of rotary sand-paper rolls for sand-papering the alined edges of a stack of boards, means for alternately shifting said rolls parallel to the axis of their rotation, a stationary track, a frame movable on said track, a work-supporting table arranged for slidable movement transversely to said frame, and a traveling abrasive belt arranged to sand-paper the face of the top board in said stack.

9. In a sand-papering machine and in combination, a plurality of rotary vertically mounted abrasive rolls for sand-papering the alined edges of a stack of boards, means for alternately raising and lowering said rolls simultaneously with their axial rotation, a track, a frame movable on said track, a work-supporting table movable on said frame, means for moving said table transversely to said frame and to and from said rolls, a continuous traveling abrasive belt arranged to sand-paper the face of the top board in said stack, a pressure shoe arranged to reciprocate and exert pressure on the lower run of said belt for working contact with said top board, and means for reciprocating said shoe.

10. In a sand-papering machine and in combination, a plurality of rotary vertically mounted abrasive rolls for sand-papering the alined edges of a stack of boards, means for alternately raising and lowering said rolls simultaneously with their axial rotation, a track, a frame movable on said track, a work-supporting table mounted on said frame, manually operable means for moving said table transversely to said frame, a vertically movable platform on said table, means for raising and lowering said platform, a continuous traveling abrasive belt arranged to sand-paper the face of the top board in said stack, a pressure shoe arranged to reciprocate and exert pressure on the lower run of said belt for working contact with said top board, and means for reciprocating said shoe.

11. In a sand-papering machine and in combination, a plurality of rotary vertically mounted parallel abrasive rolls, an oscillating arm for raising and lowering said rolls simultaneously with their axial rotation, said rolls arranged to sand-paper the alined edges of a stack of boards, means for operating said oscillating arm, a track, a frame movable on said track, a work-supporting table mounted on said frame, means for moving said table transversely to said frame, a vertically movable platform mounted on said table, independent means for raising and lowering said platform, a plurality of continuous traveling abrasive belts, a plurality of reciprocating pressure shoes exerting pressure upon the lower runs of said belts, resilient mountings for said shoes, a cross beam connecting said mountings, tracks for guiding said cross beam, a grooved sheave rigidly mounted on said beam, a segmental sprocket mounted in the groove of said sheave, a chain drive for alternately bodily moving and partially rotating said sprocket, a stop on the face of said sprocket, a slidable bar carried by said beam for limiting the movement of said sprocket by engagement with said stop, and stationary means for engaging said slidable bar to shift same from under said stop to permit the rotation of said sprocket whereby the movement of the beam and shoes will be reversed.

12. In a sand-papering machine and in combination, a continuous traveling abrasive belt arranged to sand-paper the face of a board, a pressure shoe arranged to reciprocate and exert pressure on the lower run of said belt for working contact with the board, a threaded rod having alternate reverse rotations, a connection between said rod and shoe for imparting reciprocatory movement to said shoe, a mechanism for propelling and automatically reversing the rotation of said threaded rod, and lugs adjustable to predetermined stationary positions arranged for engagement by said connection whereby said mechanism will be operated to reverse the rotation of said rod.

13. In a sand-papering machine and in combination, a frame, a pair of parallel vertically mounted abrasive rolls, movable supports for said rolls, guides for said supports, belts connecting said rolls with a power shaft for imparting rotary motion to same, a threaded rod having alternate reverse rotations, a connection between said rod and one of said supports for said rolls whereby said rolls are reciprocated transversely to and simultaneously with their axial rotation, and means for alternately raising and lowering said rolls during their rotary axial motion and transverse travel.

In witness whereof I have hereunto subscribed my name this 29th day of July, 1918.

JOHN SIAKEL.